(12) United States Patent
Even

(10) Patent No.: US 12,415,167 B1
(45) Date of Patent: Sep. 16, 2025

(54) PLANAR VESSEL MIXING USING A BRUSHLESS DRIVE SURROUNDING THE REACTION SPACE

(71) Applicant: Honeywell Federal Manufacturing & Technologies, LLC, Kansas City, MO (US)

(72) Inventor: Dakota Even, Kansas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 0 days.

(21) Appl. No.: 18/958,430

(22) Filed: Nov. 25, 2024

(51) Int. Cl.
  *B01F 33/452* (2022.01)
  *B01F 35/00* (2022.01)
  (Continued)

(52) U.S. Cl.
  CPC .......... *B01F 33/452* (2022.01); *B01F 35/187* (2022.01); *B01F 35/221422* (2022.01); *B01F 35/222* (2022.01); *B01F 35/3204* (2022.01); *B01F 35/92* (2022.01); *B01J 19/0013* (2013.01); *B01J 19/0066* (2013.01); *B01J 19/06* (2013.01); *B01J 19/18* (2013.01);
  (Continued)

(58) Field of Classification Search
  CPC .... B01J 19/0013; B01J 19/0066; B01J 19/06; B01J 19/18; B01J 2219/00087; B01J 2219/00135; B01J 2219/00189; B01F 35/18; B01F 35/221422; B01F 35/222; B01F 35/3204; B01F 35/92; B01F 2035/99; B01F 2101/2204
  See application file for complete search history.

(56) References Cited

U.S. PATENT DOCUMENTS

| | | | |
|---|---|---|---|
| 4,752,138 A | | 6/1988 | Rufer |
| 5,851,494 A | * | 12/1998 | Dillard ................ B01J 19/0046 422/50 |

(Continued)

FOREIGN PATENT DOCUMENTS

KR    20220101218    7/2022

OTHER PUBLICATIONS

Allonneau et al., "Hydrodynamic characterization of a new small-scale reactor mixed by a magnetic bar", Biochemical Engineering Journal 96 (2015) 29-37, 2014 Elsevier B.V., www.elsevier.com/locate/bej.

(Continued)

*Primary Examiner* — Lessanework Seifu
(74) *Attorney, Agent, or Firm* — Erise IP, P.A.

(57) ABSTRACT

A planar vessel mixing system is disclosed. The mixing system may include a mixing vessel, which may be a filter reactor, with a mixing region for receiving mixing substances, which may be liquid or solid. The vessel may include at least one magnetic stir bar to mix the substances. At least one brushless magnetic drive may be disposed externally around the mixing vessel and may be configured to generate a rotating magnetic field to rotate the magnetic stir bar, thereby mixing the mixing substances. The brushless magnetic drive may be adjustable along a length of the mixing vessel. A filter may be disposed at the bottom of the mixing vessel to filter out byproducts from the mixing. Use of the brushless magnetic drive may enable small-scale mixing (e.g., less than 100 mL) by removing the need for an overhead stirrer.

20 Claims, 5 Drawing Sheets

(51) Int. Cl.
*B01F 35/221* (2022.01)
*B01F 35/222* (2022.01)
*B01F 35/32* (2022.01)
*B01F 35/92* (2022.01)
*B01J 19/00* (2006.01)
*B01J 19/06* (2006.01)
*B01J 19/18* (2006.01)
*H02K 16/04* (2006.01)
*H02K 21/20* (2006.01)
*B01F 35/90* (2022.01)
*B01F 101/00* (2022.01)

(52) U.S. Cl.
CPC .............. *H02K 16/04* (2013.01); *H02K 21/20* (2013.01); *B01F 2035/99* (2022.01); *B01F 2101/2204* (2022.01); *B01J 2219/00087* (2013.01); *B01J 2219/00135* (2013.01); *B01J 2219/00189* (2013.01)

(56) References Cited

U.S. PATENT DOCUMENTS

| | | | |
|---|---|---|---|
| 6,890,491 B1* | 5/2005 | Feygin | B01L 3/565 |
| | | | 422/131 |
| 6,988,825 B2* | 1/2006 | Coville | B01F 33/452 |
| | | | 366/273 |
| 11,819,813 B2 | 11/2023 | Schob | |
| 2010/0008182 A1* | 1/2010 | Krusche | B01F 35/212 |
| | | | 366/273 |
| 2015/0265985 A1 | 9/2015 | Cutting | |

OTHER PUBLICATIONS

Reichert et al., "Bearingless Permanent-Magnet Motor with 4/12 Slot-Pole Ratio for Bioreactor Stirring Applications", Institute of Electrical and Electronics Engineers' IEEE/ASME Transactions on Mechatronics (vol. 16, Issue 3), Jun. 2011.

* cited by examiner

PLANAR VESSEL MIXING USING A BRUSHLESS DRIVE SURROUNDING THE REACTION SPACE

STATEMENT OF GOVERNMENT SUPPORT

This invention was made with government support under Contract No.: DE-NA-0002839 awarded by the United States Department of Energy/National Nuclear Security Administration. The government has certain rights in the invention.

BACKGROUND

1. Field

Embodiments of the current disclosure generally relate to mixing in small-scale vessels (e.g., having a volume of less than 100 mL). More specifically, embodiments of the current disclosure relate to non-contact planar mixing using a brushless magnetic drive that generates a rotating magnetic field to drive a magnetic stir bar in a vessel to induce mixing.

2. Related Art

Small-scale vessels, such as tabletop filter reactors with bottom drain ports and mixing volumes less than 100 milliliters, are often used for continuous flow chemistry. Specifically, vessels of this scale are frequently used for liquid-liquid and solid-liquid multiphase systems, automated experimentation, chemical exploration, and expensive materials, where using larger vessels is overly wasteful. Currently, mixing of heterogeneous systems in small-scale vessels is typically performed either in standard lab glassware, followed by material transfer and manual filtration, or in a dedicated filter-bottom reactor. It is often desirable for such systems to filter solids (e.g., crystals or other solids) in a dedicated filter-bottom reactor, while filtering out the remaining liquids, often via a bottom-mounted drain port. The presence of a bottom drain port within such glassware requires overhead agitation where an agitator (e.g., a stirrer) is inserted into the mixing volume from the top of the mixing vessel. However, the use of overhead stirring imposes additional spatial limitations on the vessels in order to accommodate the size of the overhead stirring apparatus. Mixing vessels with overhead stirring units and bottom filters are typically limited to a minimum working volume of 150 milliliters. As discussed above, the use of larger vessels can lead to excessive waste of materials, which can be prohibitive in applications such as pharmaceuticals, where reactants include expensive or scarce substances. Additionally, leakage may occur where the overhead stirrer apparatus is connected to the vessel. In some instances, the substances being mixed are dangerous, such that a leak could be dangerous.

Some small-scale vessels utilize a tabletop magnetic stir plate that stirs a magnetic stir bar located in the mixing vessel. However, the presence of the aforementioned bottom drain ports or filtration systems prevents the use of magnetic stir plates. Further, such systems typically rely on the manual intervention in the process by an operator (for example, to manually filter the products of the reaction) and are generally limited to reactions conducted at atmospheric pressure, since the vessel must be opened at multiple points in the chemical process for operator access. Such actions are of particular concern for air-sensitive experiments, as opening a vessel multiple times for manual intervention may increase the risk of harmful exposure the reactants and the reaction environment to air. As such, what is needed is a system for small-scale mixing (e.g., less than 100 mL) that obviates the need for an overhead stirrer.

SUMMARY

Embodiments of the current disclosure solve the above-described problems and provide a distinct advancement in the art by providing systems and methods for non-contact mixing for small-scale filter reactors, such as those having a volume of less than 100 mL. Planar vessel mixing systems, where the stirring action is in a single plane, may comprise a mixing vessel with a magnetic stir bar, such as a filter reactor, and a non-contact, brushless magnetic drive for driving the magnetic stir bar. The brushless magnetic drive may be positioned external to the mixing vessel and may generate a rotating magnetic field that rotates the magnetic stir bar.

The systems described herein may enable mixing in small-scale filter reactors, which may enable continuous processes via integration into flow chemistry at a tabletop scale. Moreover, the contactless mixing systems described herein may be integrated into pressurized systems, allowing for a wider range of operating temperatures and pressures at which processes can occur. Magnetic stirring of the mixing substances eliminates the need for overhead agitation that burdens systems with additional pressurization and spatial requirements. As a result, filter reactor systems and other vessels may be configured to avoid batch synthesis and to increase the throughput and overall yield of the process. Moreover, the capacity of the mixing vessel for pressurization permits operators to run reactions at higher temperatures, allowing for a broader range of potential solvents to be used, thus expanding the type of reactions and subsequent filtration that the mixing system can execute.

In some aspects, the techniques described herein relate to a mixing system, including: a mixing vessel, including: a fluid inlet; a mixing region configured to receive a first mixing substance and a second mixing substance via the fluid inlet; and at least one outlet fluidly connected to the mixing region; a magnetic stir bar disposed within the mixing vessel; a brushless magnetic drive that surrounds the mixing vessel and that is configured to generate a rotating magnetic field, thereby rotating the magnetic stir bar to mix the first mixing substance with the second mixing substance; and a controller configured to control a speed and a direction of the rotating magnetic field.

In some aspects, the techniques described herein relate to a system for vessel mixing, including: a pressurizable mixing vessel, including: at least one inlet; a mixing region configured to receive a first mixing substance and a second mixing substance via the at least one inlet; and at least one outlet fluidly connected to the mixing region; a magnetic stir bar disposed within the pressurizable mixing vessel; and a brushless magnetic drive surrounding the pressurizable mixing vessel and configured to generate a rotating magnetic field, thereby rotating the magnetic stir bar to mix the first mixing substance with the second mixing substance.

In some aspects, the techniques described herein relate to a system for planar vessel mixing, including: a mixing vessel, including: a fluid inlet; a mixing region configured to receive a first mixing substance and a second mixing substance via the fluid inlet; and at least one outlet fluidly connected to the mixing region; a magnetic stir bar disposed within the mixing vessel; a first brushless magnetic drive surrounding the mixing vessel and operable to generate a first magnetic field that rotates a first magnetic stir bar to thereby mix the first mixing substance and the second mixing substance; and a second brushless magnetic drive that surrounds the mixing vessel.

This summary is provided to introduce a selection of concepts in a simplified form that are further described below in the detailed description. This summary is not intended to identify key features or essential features of the claimed subject matter, nor is it intended to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1A:
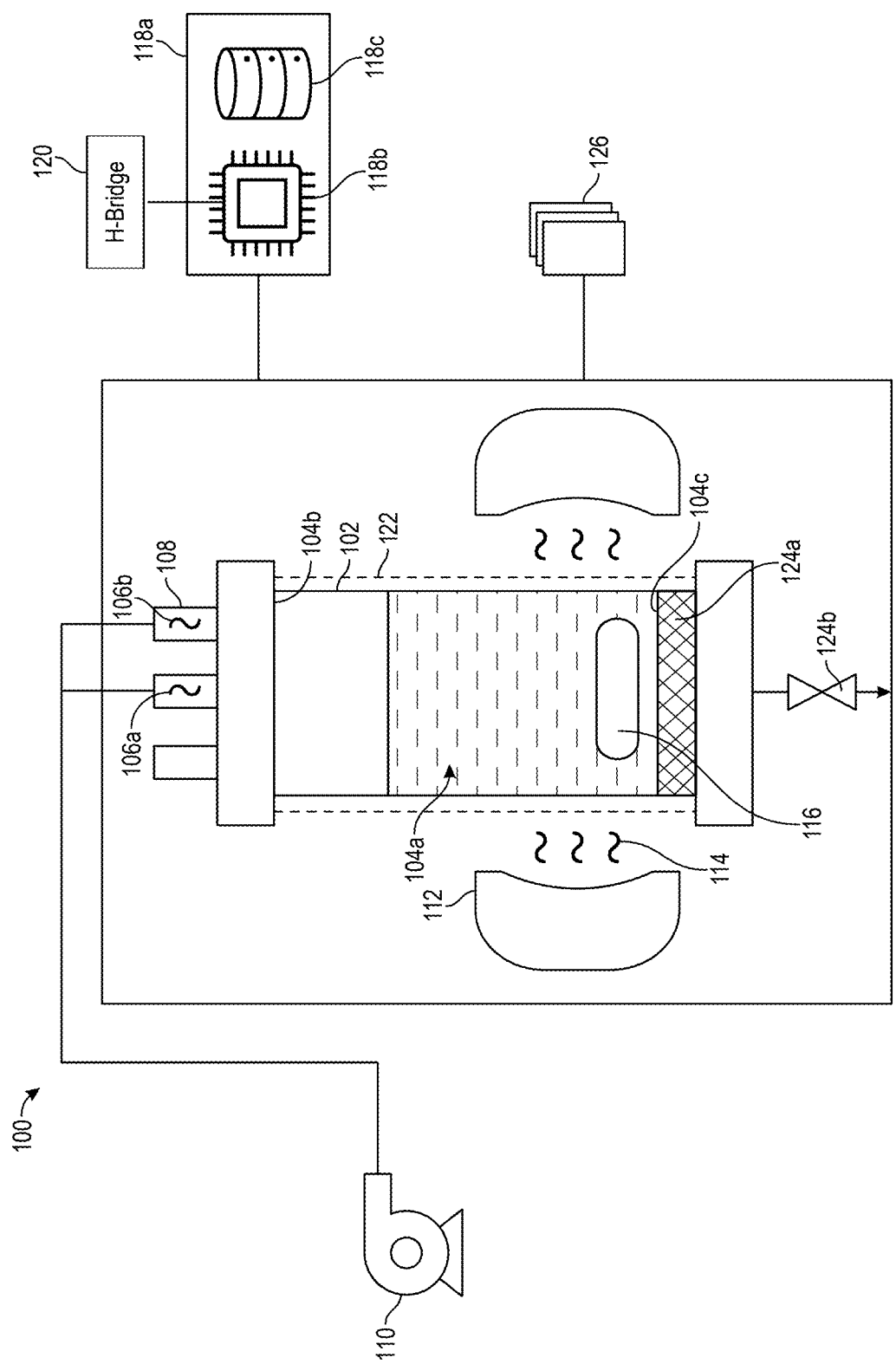
FIG. 1A depicts a schematic view of a planar vessel mixing system for some embodiments.

The drawing figures do not limit the present disclosure to the specific embodiments disclosed and described herein. The drawings are not necessarily to scale; emphasis is instead placed upon clearly illustrating the principles of the present disclosure.

DETAILED DESCRIPTION

The following description of embodiments of the present disclosure references the accompanying illustrations that illustrate specific embodiments in which the present disclosure can be practiced. The embodiments are intended to describe aspects of the invention in sufficient detail to enable those skilled in the art to practice the present disclosure. Other embodiments can be utilized, and changes can be made without departing from the scope of the present disclosure. The following detailed description is, therefore, not to be taken in a limiting sense.

In this description, references to "one embodiment," "an embodiment," "embodiments," "various embodiments," "certain embodiments," "some embodiments," or "other embodiments" mean that the feature or features being referred to are included in at least one embodiment of the technology. Separate references to "one embodiment," "an embodiment," "embodiments," "various embodiments," "certain embodiments," "some embodiments," or "other embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Generally, embodiments of the current disclosure are directed to a planar vessel mixing system for control of continuous chemical processes of small-volume solutions, such as liquid-liquid mixing and liquid-solid mixing. As used herein, a small volume or small vessel refers to any volume or vessel having a mixing volume of less than 100 milliliters. It will be appreciated that embodiments of the present disclosure are not limited to mixing volumes less than 100 milliliters, and that, generally, any mixing volume may be used. As discussed further herein, the disclosed embodiments may be advantageous for use with filter reactors that are typically limited to a minimum working volume of 150 milliliters, as these filter reactors must fit an overhead stirring unit, along with loading ports for supplying the mixing constituents into the mixing volume.

More specifically, some embodiments of the current disclosure are directed to magnetic agitation of filtration vessels, including filter reactors that require agitation but experience spatial limitations for an agitator or mixer due to the presence and location of filters. The planar vessel mixing system may include a brushless magnetic drive that may be positioned externally to the mixing vessel and may generate a rotating magnetic field to spin a magnetic mixer (e.g., a magnetic stir bar) located within the mixing vessel for non-contact mixing. The brushless magnetic drive may include a stator that generates an alternating magnetic field, with the magnetic stir bar functioning as a rotor. The brushless drive may surround the vessel at various vertical positions of the mixing region, allowing for thorough agitation of mixing substances at various locations within the mixing region. Thus, the drive system may encompass the reaction space of the filter reactor in contrast to prior drive systems that are overhead the filter reactor, leading to the above-mentioned spatial and continuous flow chemistry problems by providing a planar vessel mixing system that enables integration of tabletop scale flow chemistry in chemical processes, which may be useful in continuous manufacturing systems that utilize mixing volumes less than 100 milliliters.

As discussed, the mixing vessel may be a filter reactor, which is a mixing vessel in which a chemical reaction can occur through the mixing of multiple substances or reactants, and that includes a filter for filtration of the resulting reaction products. The mixing substances enter the filter reactor via inlet ports at the top of the filter reactor. Following the reaction, any solid products of the reaction are filtered out to prevent them from passing through to the next component of the manufacturing system along with the desired solution.

Figure 1B:
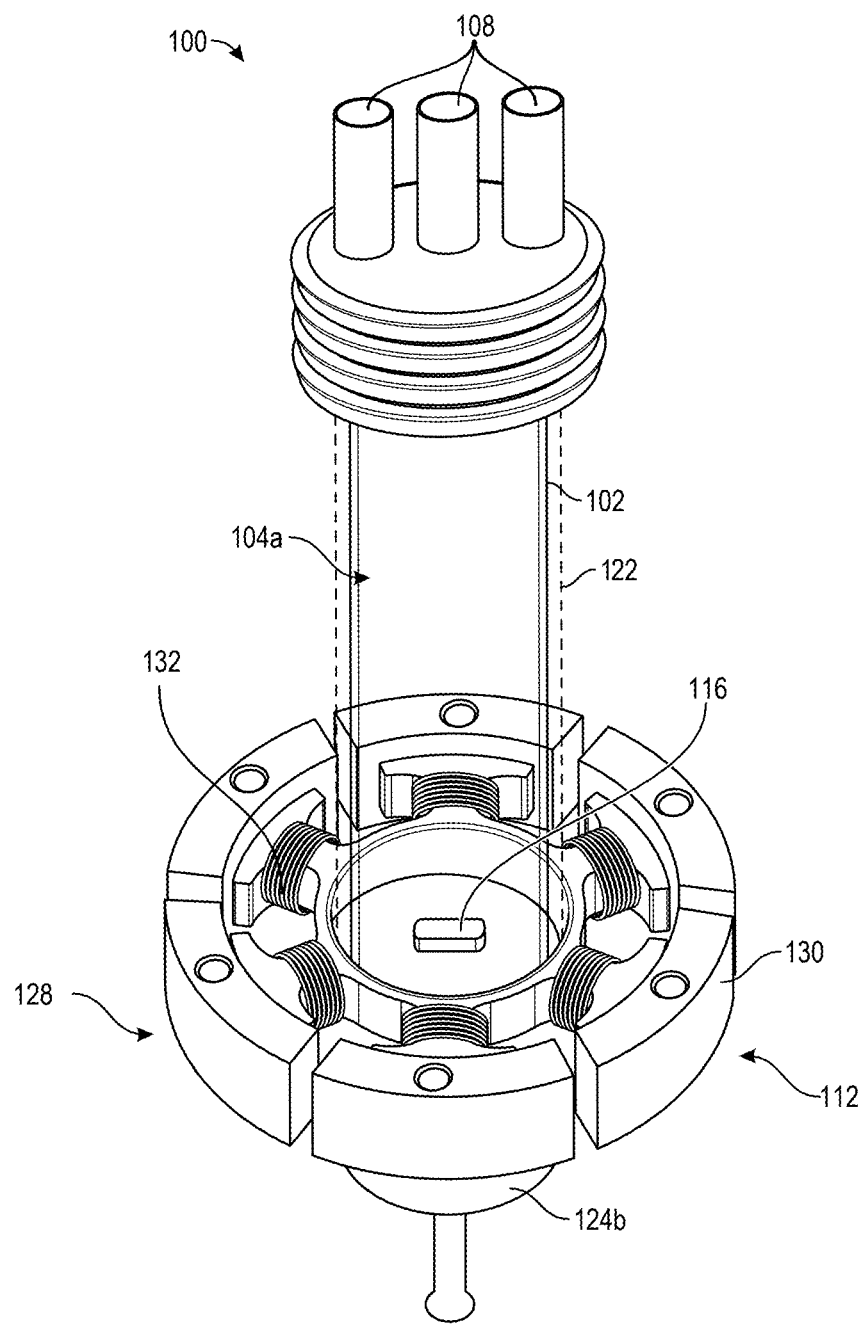
FIG. 1B depicts an isometric view of the planar vessel mixing system for some embodiments.
Figure 1C:
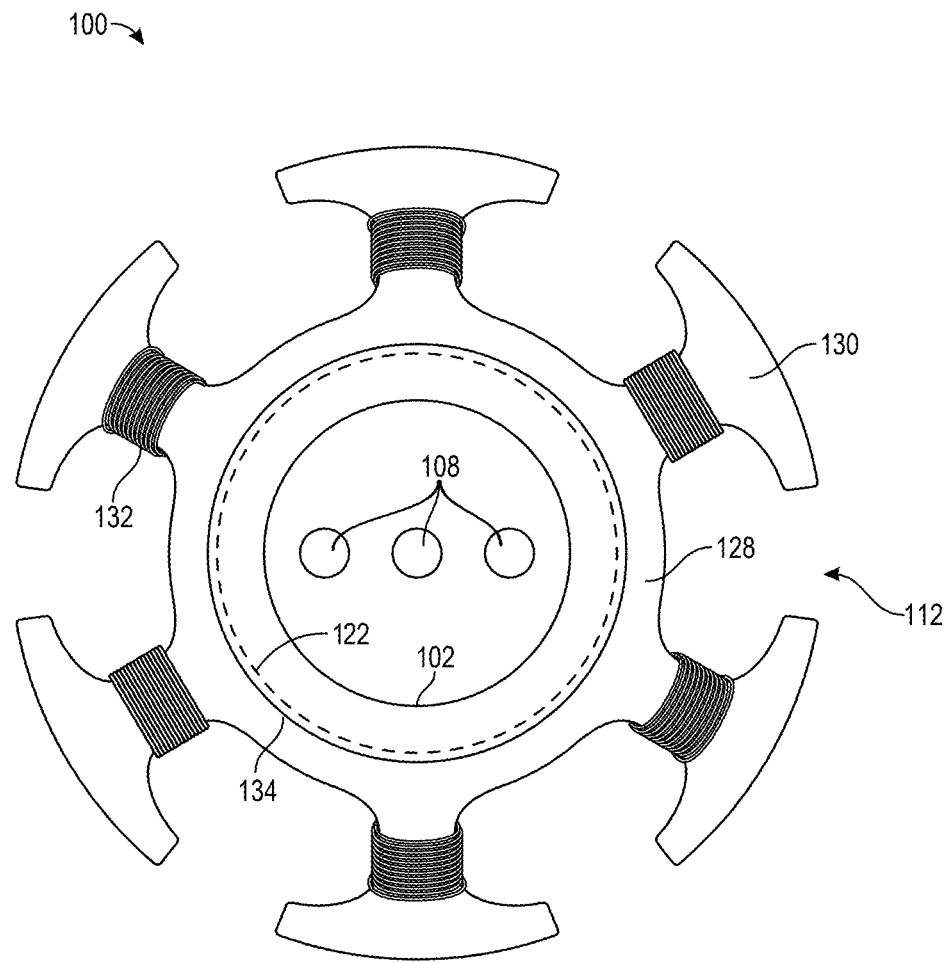
FIG. 1C depicts a top perspective view of the planar vessel mixing system for some embodiments.

FIGS. 1A, 1B, and 1C illustrate a schematic view, an isometric view, and a top perspective view, respectively, of a mixing system 100 in accordance with embodiments of the present disclosure. Mixing system 100 may include a mixing vessel 102, which may be a filter reactor. Mixing vessel 102 may be generically cylindrical or may take various other geometries (e.g., rectangular prism, triangular prism, trapezoidal prism, or having a conical or round body with a cylindrical neck) without departing from the scope hereof. In some embodiments, the mixing vessel 102 is configured for small-scale, tabletop chemical processes in continuous manufacturing systems. As used herein, the term "small-scale," may mean that mixing vessel 102 has an internal volume of about 1 milliliter to about 100 milliliters, or of about 1 milliliter to about 50 milliliters, or of about 1 milliliter to about 25 milliliters. In some embodiments, the mixing vessel 102 may have an internal volume of about 10 milliliters to about 20 milliliters. In some embodiments, the mixing volume may be less than 10 milliliters, less than 100 milliliters, less than 1 liter, or less than 10 liters. It will be appreciated that mixing volumes of greater than 100 milliliters (e.g., about 500 milliliters, about 1 liter, about 5 liters, etc.) are within the scope hereof. As previously discussed, filter reactors are typically constrained to having volumes of at least 150 milliliters to accommodate an overhead stirring apparatus; thus, providing mixing vessel 102 capable of mixing substances in a mixing volume of less than 100 milliliters is advantageous to enable mixing on a smaller scale than is possible with overhead stirrers.

Mixing vessel 102 may include a mixing region 104a in which substance 106a and substance 106b may be mixed. Although two substances are described herein for brevity, any number of substances may be mixed within the scope of the present disclosure. The mixing vessel 102 may be configured to accommodate continuous processes involving both chemical reaction and solution filtration within the same vessel in a mixing region 104a. The mixing region 104a may be vertically bounded by a top surface 104b of the mixing vessel 102 and a bottom surface 104c of the mixing vessel 102. The distance between top surface 104b and bottom surface 104c may define the length of the mixing vessel 102.

The mixing region 104a may receive substance 106a and substance 106b via inlet ports 108. Inlet ports 108 may be fluidly connected to the mixing region 104a. In some embodiments, mixing vessel 102 comprises a combined inlet/outlet port through which substances 106a, 106b enter and exit Each substance, such as substance 106a and substance 106b, may comprise a reactant or, more generally, a component (also referred to as mixing constituents) added to the mixing vessel 102 for a chemical reaction. For example, substance 106a and substance 106b may be pharmaceutical compounds that are to be mixed in mixing region 104a. The inlet ports 108 may be coupled to the mixing vessel 102 proximate to the mixing region 104a in some embodiments.

The mixing vessel 102 may be configured to operate at non-atmospheric pressures and may, as such, be pressurizable (e.g., pressure-tight and having a sufficient tensile strength to contain a desired operating pressure). Accordingly, in some embodiments, at least one pump such as pump 110 may be provided to pressurize the mixing vessel 102, allowing for the integration of the vessel into pressurized systems operating at non-atmospheric pressures. Other pressure sources may be employed. In some embodiments, the mixing vessel 102 may be pressure-rated up to 150 pounds per square inch. Pump 110 may also be configured to pump in one or more of substance 106a and substance 106b into the mixing region 104a. In some embodiments, multiple instances of pump 110 are provided, such as one pump for each of substance 106a and substance 106b that is fed into the mixing vessel 102.

Additionally, in some embodiments, inert gases, such as nitrogen, may be added to the headspace of mixing vessel 102 (i.e., the region above substance 106a and substance 106b in mixing region 104a) in order to prevent oxidation during continuous manufacturing system reactions. Thus, the chemical reaction and subsequent filtration may occur without exposing the mixture to open air, preventing oxidation and contamination during the continuous chemical process. In some such embodiments, the inlet ports 108 may be used to fill the headspace of the mixing vessel 102 with inert gases. For example, when mixing vessel 102 includes three instances of inlet ports 108 as shown, two of the instances of inlet ports 108 may be used to deliver substance 106a and substance 106b into mixing region 104a, and the third of the instances of inlet ports 108 may be used to deliver the inert gases into the mixing vessel 102.

In some embodiments, the mixing vessel 102 may be constructed of glass, ideally structured to allow for continuous observation and for achieving a sufficient pressure rating for non-atmospheric pressures. However, the mixing vessel 102 may also be formed from plastics, metals, or alloys. In some embodiments, the mixing vessel 102 may be constructed of metals such as stainless steel (e.g., 316 stainless steel, 316L stainless steel, etc.). In some embodiments still, the mixing vessel 102 may be formed from stainless steel alloys (e.g., alloy A-286, 20, 230, 400, 600, 625, B-2/B-3, C-276, etc.) without departing from the scope hereof. Generally, mixing vessel 102 may be formed of any material.

To mix substance 106a with substance 106b, the mixing system 100 may further include at least one instance of magnetic drive 112 that may be coupled to mixing vessel 102 and disposed around the exterior (e.g., the circumference) of the mixing vessel 102. The magnetic drive 112 may, in some embodiments, surround the mixing vessel 102 such that the magnetic drive 112 is concentric with the mixing vessel 102 (see FIG. 1C). In some embodiments, the magnetic drive 112 may be powered by an external power source such as, but not limited to, a battery (not shown). Generally, magnetic drive 112 may be located at any vertical position along the exterior of the mixing vessel.

The magnetic drive 112 may be energized in an alternating circular pattern such that a rotating magnetic field 114 is produced. The rotating magnetic field 114 may then rotate a magnetic stir bar 116 located within the mixing region 104a. The magnetic stir bar 116 may be positioned in mixing region 104a and may be suspended at a vertical position within mixing vessel 102 that corresponds with the vertical position of magnetic drive 112. That is, the rotating magnetic field 114 may align or hold the magnetic stir bar 116 therewith. Thus, the combination of magnetic drive 112 and magnetic stir bar 116 stir bar forms a brushless DC motor, with magnetic drive 112 forming the stator, and magnetic stir bar 116 forming the rotor.

In some embodiments, the magnetic stir bar 116 is generally cylindrical or stadium-shaped, as shown. However, it will be appreciated that the magnetic stir bar 116 may take various other shapes (e.g., rectangle, X-shape, triangle, helix, donut, etc.) without departing from the scope hereof. In some embodiments, magnetic stir bar 116 may extend vertically along the length of mixing region 104a (see FIG. 3), which may aid in uniform agitation of substance 106a and substance 106b. For example, the magnetic stir bar 116 may have a length that is about 25% of the length of mixing region 104a, about 50% of the length of mixing region 104a, about 75% of the length of mixing region 104a, or about 100% the length of mixing region 104a. Such an instance of magnetic stir bar 116 may have any of the aforementioned shapes discussed above. In some embodiments, magnetic stir bar 116 may comprise a polytetrafluoroethylene (PTFE) coated magnet (e.g., PTFE coated alnico). Other materials are within the scope hereof including, but not limited to, samarium cobalt, neodymium, or ferrite. Glass coatings may also be employed. Generally, magnetic stir bar 116 may comprise any magnetic material such that magnetic stir bar 116 is rotatable by the rotating magnetic field 114. Although magnetic stir bar 116 is referred to herein as "magnetic," embodiments are contemplated where magnetic stir bar 116 is ferromagnetic rather than a permanent magnet or conductive such that magnetic properties are created by induced magnetism (for example, electromagnetism or induced currents).

In some embodiments, the location of magnetic drive 112 along the length of mixing region 104a is adjustable (the length being measured from top surface 104*b* to bottom surface 104*c*). In some embodiments, the position of magnetic drive 112 is manually adjustable, and the operator may adjust the magnetic drive 112 vertically along the length of the mixing vessel 102, such that the magnetic drive 112 may surround the mixing region 104*a* at different vertical locations. As shown, magnetic drive 112 may have an inner surface that is in contact with an exterior surface of mixing vessel 102 and may be held in place by friction and/or by other coupling means, such as fasteners, adhesives, or the like. In such instances, the magnetic drive 112 will generate a rotating magnetic field 114 as disclosed and control agitation via the magnetic stir bar 116 along the common plane at the vertical position of the magnetic drive 112. Thus, vertical adjustment of the magnetic drive 112 allows improved control of mixing substance 106*a* and substance 106*b*, especially of mixing volumes that occupy at least 50% of the mixing region 104*a*. It is contemplated that the magnetic drive 112 may itself be actuated by a drive system or the like to adjust the position along mixing vessel 102 during mixing, for example, powered by a motor to slide along the length of mixing vessel 102.

The magnetic drive 112 may be controlled by a computer or controller 118*a*, thereby enabling control of the rotating magnetic field 114. In some embodiments, controller 118*a* is configured to control the speed and/or the direction of the rotating magnetic field 114. Controller 118*a* may comprise a processor 118*b* and a memory 118*c*. Memory 118*c* may be configured to store non-transitory computer-readable media executable by processor 118*b*. For example, memory 118*c* may store executable software instructions for controlling the speed and/or direction of the rotating magnetic field 114. Generally, memory 118*c* may store computer-executable instructions executable by processor 118*b* to carry out any of the functionality of the systems described here. For example, controller 118*a* may further control pump 110.

Additionally, in some embodiments, controller 118*a* may include or otherwise control at least one H-bridge circuit 120. In some such embodiments, the at least one H-bridge circuit 120 is configured to control the direction (for example, by reversing the polarity of an electromagnetic circuit) and/or the speed of rotation of rotating magnetic field 114. Control of the speed may be accomplished by varying the voltage applied across a load via the at least one H-bridge circuit 120 as will be appreciated by one of skill in the art. To alter the direction in which voltage is supplied, the at least one H-bridge circuit 120 may control the series of switches that deliver power to the load. Hall effect sensors may also be employed to monitor the position of magnetic stir bar 116 as it rotates so as to appropriately modulate the energization of the coils of magnetic drive 112 to produce rotation of magnetic stir bar 116 at a speed controllable by controller 118*a*.

Mixing system 100 may further include a heating element 122 to control the temperature of the mixing vessel 102. Specifically, heating element 122 may heat substance 106*a* and substance 106*b* to a temperature necessary for process reactions to proceed and may further aid in the efficiency of chemical reactions, filtrations, and crystallizations. Although heating element 122 is described herein, it should be understood that a cooling jacket could be employed in a similar fashion to reduce the temperature of mixing vessel 102 if desired. For example, a cooling jacket comprising a plurality of fluid pathways for coolant to flow around mixing vessel 102 could be employed to control the temperature of exothermic mixing reactions. As previously discussed, one advantage of the embodiments described herein is the ability to pressurize mixing vessel 102 such that the allowable operating temperatures may be higher than when operating at atmospheric pressure. The heating element 122 may surround the mixing vessel 102 for temperature control in some embodiments. In such embodiments, the heating element 122 may be an electric heat source, such as a heater jacket coupled to an exterior of the mixing vessel 102. The heating element 122 may be between the magnetic drive 112 and the mixing vessel 102 such that the magnetic drive 112 may surround the heating element 122. Heating element 122 may extend along any portion of the length of mixing vessel 102. In some embodiments, heating element 122 extends along 25% of the length of mixing vessel 102 or mixing region 104*a*, along 50% of the length of mixing vessel 102 or mixing region 104*a*, along 75% of the length of mixing vessel 102 or mixing region 104*a*, or along 100% of the length of mixing vessel 102 or mixing region 104*a*.

As can be seen in FIG. 1C, the heating element 122 may be concentric with the mixing vessel 102. Furthermore, the heating element 122 may also be concentric with the magnetic drive 112, with the magnetic drive 112 surrounding the heating element 122. Thus, magnetic drive 112 may also be concentric with the mixing vessel 102.

As previously discussed, in some embodiments, the mixing vessel 102 is a filter reactor with a filtration system. The filtration system may include a filter 124*a* and at least one bottom outlet valve 124*b*. As some chemical reactions result in the generation of byproducts, such as solid byproducts occurring via crystallization or precipitation within the solution, the filter 124*a* may retain these byproducts without impeding the ongoing continuous process. Additionally, it may be desirable to filter out the byproducts for later collection. Advantageously, the filter 124*a* also prevents the need for filtration in a separate piece of laboratory equipment. Moreover, as no transfer of solution occurs outside of the filter reactor, there is little to no transfer loss associated with a mixing vessel 102 configured to conduct both chemical reactions in the mixing region 104*a* and filtration via the filtration system. Thus, a secondary, separate filter system is not needed. As such, filter reactors may allow for more efficient chemical reactions and increased yields of end products. Embodiments featuring a filtration system may permit improvements in process efficiency and eliminate the need for operator manual interference as will be appreciated by one of skill in the art. The filtration system may be included within mixing vessel 102 below magnetic stir bar 116 such that it does not interfere with the filtering. For example, a step may be included in the interior shell of mixing vessel 102 to retain magnetic stir bar 116 above the filter media and allow accumulation of filtrate at the bottom of mixing vessel 102.

Mixing system 100 may further comprise one or more sensors, such as sensors 126, which may be coupled to the mixing vessel 102 to monitor the operating conditions thereof. These sensors 126 may monitor various conditions, including but not limited to temperature, pressure, pH, volume, density, color, and opacity. In such embodiments, sensors may be utilized to detect the operating conditions of mixing vessel 102 throughout the duration of the reaction within mixing system 100. Monitoring of such conditions may occur during pressurization of mixing vessel 102, during the chemical reaction of substance 106*a* and substance 106*b*, during the filtration process of a resulting byproduct, or at any other point in time during the operation of mixing system 100. Sensors 126 may be communicatively coupled to controller 118*a* to transfer the sensor data thereto.

With specific reference to FIG. 1C, magnetic drive 112 is described in further detail in accordance with embodiments of the present disclosure. As shown, the magnetic drive 112 may include a stator 128, where the stator may be made up of a plurality of instances of stator teeth 130 and a plurality of instances of stator windings 132 wrapped around the stator teeth 130. The stator windings 132 may be selectively energized to establish an electromagnetic field, i.e., the rotating magnetic field 114. The timing and voltage of the energization of stator windings 132 control the strength and rotation of the rotating magnetic field 114.

The configuration of stator windings 132 around the stator teeth 130 may control the capacity and activity of the magnetic drive 112 where winding configuration is defined by how many stator teeth are present, which stator teeth 130 the stator windings 132 are located on as well as the how many loops of conductor make up each of stator windings 132. In some embodiments, the stator windings 132 may wrap around the stator teeth in at least 200 loops. Other embodiments may feature stator windings 132 that wrap around the stator teeth in less than 200 loops. Some other embodiments may utilize stator windings that wrap around the stator teeth in more than 200 loops.

In some embodiments, stator 128 includes six instances of stator teeth 130 on the stator 128. Other embodiments may have a stator design featuring more or less than six instances of stator teeth 130 on the stator 128. In some embodiments, the stator 128 includes a number of instances of stator teeth 130 that is a multiple of six, such as six, twelve, eighteen, or twenty-four instances of stator teeth 130. In some embodiments, stator 128 has a concentrated winding stator configuration that features a stator 128 with winding loops wrapped around at least one individual tooth of stator teeth 130. In some embodiments, stator windings 132 are wound only around alternating stator teeth 130. Other embodiments may utilize a stator 128 configuration where stator windings 132 are wrapped around every stator tooth of the stator 128. Still some embodiments may be employed such that a combination of alternating and sequential teeth of stator teeth 130 are wrapped with the stator windings 132 without departing from the specification hereof. For instance, as depicted, two consecutive stator teeth may have stator windings 132, followed by a third stator tooth that does not have any stator windings 132. This winding pattern may then continue for the remaining stator teeth of the stator 128.

As previously discussed, stator 128 may be coupled to the exterior of mixing vessel 102. For example, an inner surface 134 of stator 128 may directly contact the exterior surface of mixing vessel 102. When a heating element 122 is used, the inner surface 134 of stator 128 may be in contact with the heating element 122. Placing the stator 128 (and, thereby, the rotating magnetic field 114) as close to the magnetic stir bar 116 as possible may be advantageous, as the torque supplied may increase with decreasing distance between stator 128 and magnetic stir bar 116. The stator 128 may be made from any suitable material, including conventional or electrical steel, iron, steel, or fiberglass. In some embodiments, the stator 128 is formed via an additive manufacturing process.

Figure 2:
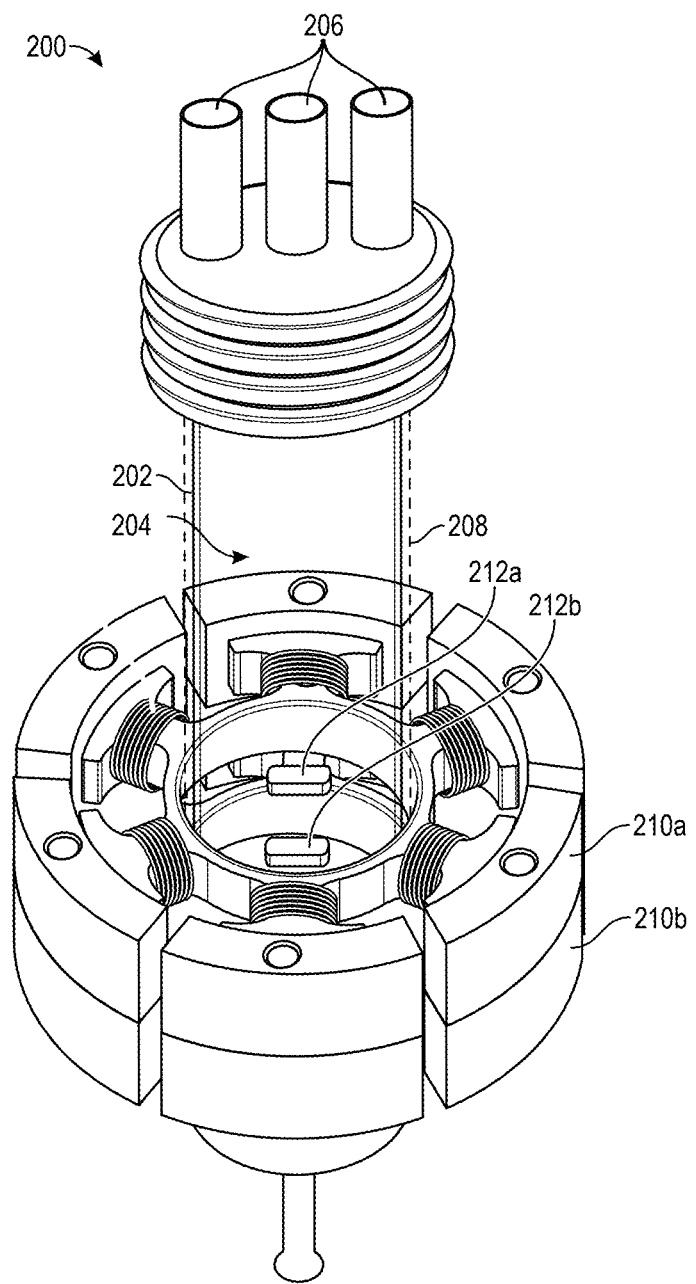
FIG. 2 depicts a planar vessel mixing system with multiple brushless magnetic drives for some embodiments.

Turning now to FIG. 2., a second example of a mixing system 200 is illustrated in accordance with embodiments of the present disclosure. Mixing system 200 may be substantially similar to mixing system 100 discussed above. Mixing system 200 may include a mixing vessel 202, a mixing region 204, inlet ports 206, and a heating element 208. Mixing system 200 may include any of the components described above with respect to FIGS. 1A-1C.

In contrast to mixing system 100, mixing system 200 comprises first brushless magnetic drive 210a and second brushless magnetic drive 210b, both surrounding the mixing vessel 202, such that the first brushless magnetic drive 210a is located above the second brushless magnetic drive 210b. As shown in FIG. 2, first brushless magnetic drive 210a and second brushless magnetic drive 210b may be stacked directly on top of each other such that the top surface of second brushless magnetic drive 210b contacts the bottom surface of first brushless magnetic drive 210a. In some embodiments, first brushless magnetic drive 210a and second brushless magnetic drive 210b are spaced apart along the length of mixing vessel 202. The presence of more than one brushless magnetic drive may provide the advantage of solution mixing along a greater length of the mixing vessel 202. This may be especially useful for embodiments with a mixing region 204 that receives mixing substances at or near the maximum fill capacity of the mixing vessel 202.

First brushless magnetic drive 210a and second brushless magnetic drive 210b may stir in tandem, e.g., operating at the same speed and/or in the same direction. In some embodiments, first brushless magnetic drive 210a and second brushless magnetic drive 210b operate at different speeds and/or rotate in different directions. Each of first brushless magnetic drive 210a and second brushless magnetic drive 210b may generate a distinct magnetic field. First brushless magnetic drive 210a and second brushless magnetic drive 210b may be controlled by a control system, such as controller 118a described above.

In some embodiments, each of first brushless magnetic drive 210a and second brushless magnetic drive 210b is configured to rotate a separate stir bar. For example, and as shown, first brushless magnetic drive 210a rotates a first magnetic stir bar 212a, and second brushless magnetic drive 210b rotates a second magnetic stir bar 212b. Mixing vessel 202 may, in some embodiments, include an internal support configured to support or hold the first magnetic stir bar 212a within the mixing region 204 at a vertical location equivalent or above a vertical location of a bottom surface of the first brushless magnetic drive 210a bottom surface. Thus, when first brushless magnetic drive 210a is not in operation, first magnetic stir bar 212a will not fall to the bottom of mixing region 204 by being supported by the intern support, and when first brushless magnetic drive 210a is activated, first magnetic stir bar 212a may be in the horizontal plane of first magnetic stir bar 212a and the magnetic field generated by first magnetic stir bar 212a such that first magnetic stir bar 212a can be rotated as described above. The internal support may project from an internal wall of mixing vessel 202 or may extend from a bottom or top of mixing region 204. For example, it is contemplated that first magnetic stir bar 212a and second magnetic stir bar 212b may be mounted to a vertical shaft (see, e.g., FIG. 3) within mixing region 204 and mounted at a location along the shaft that is in-line with the corresponding drive (e.g., first brushless magnetic drive 210a or second brushless magnetic drive 210b. In some embodiments, more than one drive is employed to drive a single stir bar, such as when a stir bar has a length that is greater than the length of a single brushless magnetic drive (see, e.g., FIG. 3). Advantageously, in some embodiments, the magnetic fields of first brushless magnetic drive 210a and second brushless magnetic drive 210b may be rotated in different directions. Spinning multiple magnetic stir bars in opposite directions may increase the agitation efficiency of the mixing system 200.

Figure 3:
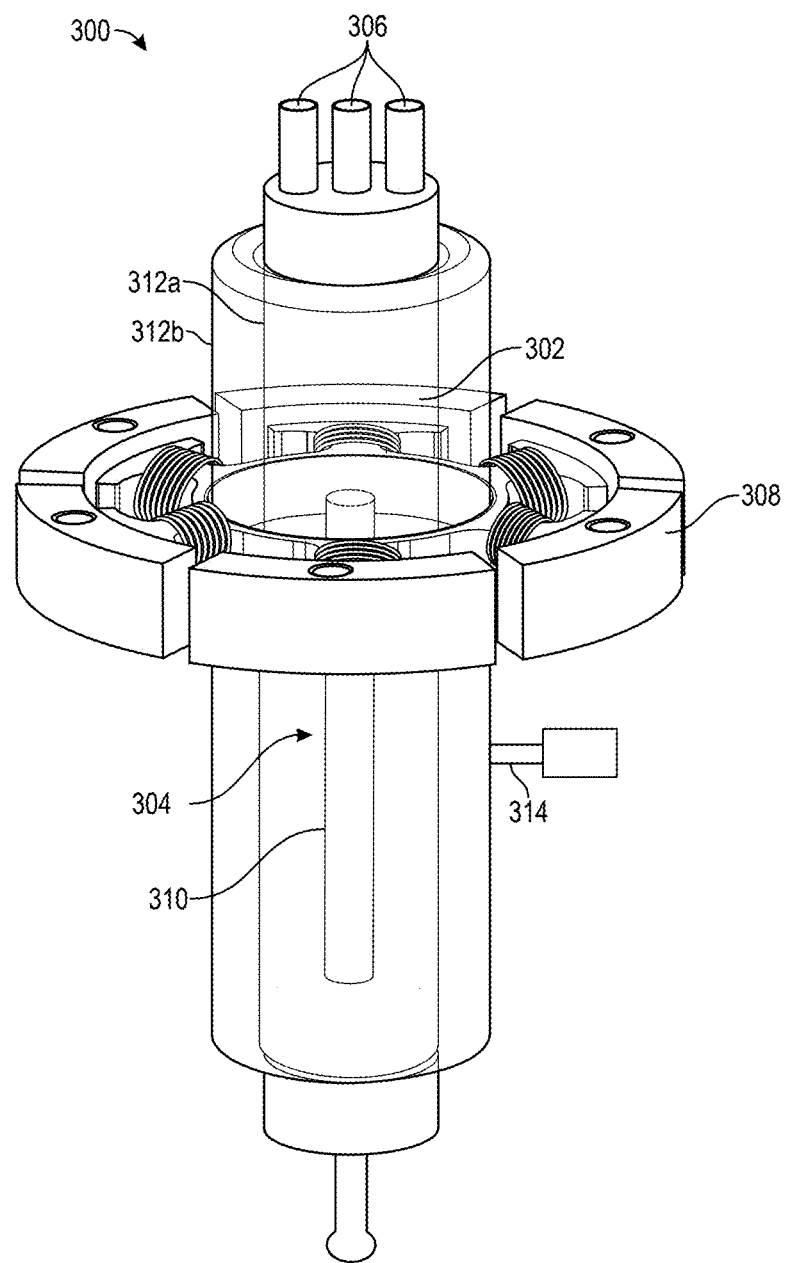
FIG. 3 depicts a planar vessel mixing system with a double-walled heating element.

FIG. 3 depicts a third example of a mixing system 300 for some embodiments. Mixing system 300 may be substantially similar to the mixing system 100 and mixing system 200 discussed above and may include a double-walled mixing vessel 302, a mixing region 304, inlet ports 306, and a brushless magnetic drive 308 that generates a rotating magnetic field (not shown) to drive a magnetic stir bar 310. In some embodiments, the magnetic stir bar 310 may be, as shown in FIG. 3, a vertical magnetic stir bar that spans a vertical length within the mixing region 304 (e.g., a portion of the overall length of mixing region 304 or the entire length). In other embodiments, the stir bar may be more similar to the horizontally oriented stir bars depicted in FIGS. 1B and 2.

In contrast to mixing system 100 and mixing system 200, mixing system 300 is configured as a double-walled mixing vessel 302, where a first wall 312a occupies the same diameter as the mixing region 304, i.e., defines the mixing volume. A second wall 312b may be concentric with both the mixing region 304 and the first wall 312a of the double-walled mixing vessel 302. The second wall 312b may have a minimum diameter that is at least larger than the diameter of the first wall 312a such that a gap is defined between the first wall 312a and the second wall 312b. At least one instance of brushless magnetic drive 308 may be coupled to the outside of the (outer) second wall 312b, as shown. At least one instance of brushless magnetic drive 308 may generate a magnetic field to rotate a magnetic stir bar 310 within double-walled mixing vessel 302, as previously discussed.

The double-walled mixing vessel 302 may employ a heating element 314 that provides heating (or cooling) between the first wall 312a and second wall 312b. Specifically, heating element 314 may be a recirculating heater (or chiller) that recirculates fluid between the first wall 312a and the second wall 312b of the double-walled mixing vessel 302 for either heating or cooling of the double-walled mixing vessel 302. Notably, the double-walled mixing vessel 302 and, thus, the heating element 314 may extend the same length as the mixing region 304. However, in some other embodiments, the length of the heating element 314 may only extend over a length less than the overall length of the double-walled mixing vessel 302. In such instances, the heating element 314 may be designed to align with the length of the mixing region 304 occupied by some pre-established volume of mixing substances.

The heating element 314, which may be a recirculating heater that recirculates fluid between a first wall 312a and a second wall 312b of a double-walled mixing vessel 302, may also provide mixing system 300 with an external layer to pull a vacuum on for filtration purposes. The vacuum may provide insulation of the double-walled mixing vessel 302 and the one or more mixing substances being mixed or filtered therewithin. Insulation can assist in reducing the load on temperature control and in further increasing the efficiency of the chemical process.

It will be appreciated that, while not depicted in FIG. 3, multiple instances of brushless magnetic drive 308 surrounding the second wall 312b of the double-walled mixing vessel 302 may be stacked directly on top of each other, such as shown in FIG. 2. Still other embodiments may feature multiple instances of brushless magnetic drive 308 surrounding the second wall 312b of the double-walled mixing vessel 302 but with some vertical distance between the instances of brushless magnetic drive 308. As is the case in FIG. 1B, a single instance of brushless magnetic drive 308 may be adjusted by an operator (or automatically) vertically along the length of the double-walled mixing vessel 302 such that the brushless magnetic drive 308 may surround the mixing region at a plurality of vertical locations.

Features described above as well as those claimed below may be combined in various ways without departing from the scope hereof. The following examples illustrate some possible, non-limiting combinations:

Clause 1. A mixing system, comprising: a mixing vessel, comprising: a fluid inlet; a mixing region configured to receive a first mixing substance and a second mixing substance via the fluid inlet; and at least one outlet fluidly connected to the mixing region; a magnetic stir bar disposed within the mixing vessel; a brushless magnetic drive that surrounds the mixing vessel and that is configured to generate a rotating magnetic field, thereby rotating the magnetic stir bar to mix the first mixing substance with the second mixing substance; and a controller configured to control a speed and a direction of the rotating magnetic field.

Clause 2. The mixing system of clause 1, further comprising a heating element configured to heat the mixing vessel, wherein the heating element surrounds the mixing vessel and extends along an exterior length of the mixing vessel.

Clause 3. The mixing system of clause 1 or clause 2, wherein the mixing region has a volume less than 100 milliliters.

Clause 4. The mixing system of any of clauses 1-3, further comprising a pump coupled to the mixing vessel and operable to pressurize the mixing vessel.

Clause 5. The mixing system of any of clauses 1-4, wherein the brushless magnetic drive is adjustable vertically along a length of the mixing vessel to adjust a vertical position of the magnetic stir bar.

Clause 6. The mixing system of any of clauses 1-5, wherein the brushless magnetic drive is a first brushless magnetic drive, the rotating magnetic field is a first rotating magnetic field, and the mixing system further comprises: a second brushless magnetic drive surrounding the mixing vessel and configured to generate a second rotating magnetic field.

Clause 7. The mixing system of any of clauses 1-6, wherein the magnetic stir bar is a first magnetic stir bar and the mixing system further comprises: a second magnetic stir bar that is rotated by the second rotating magnetic field.

Clause 8. A system for vessel mixing, comprising: a pressurizable mixing vessel, comprising: at least one inlet; a mixing region configured to receive a first mixing substance and a second mixing substance via the at least one inlet; and at least one outlet fluidly connected to the mixing region; a magnetic stir bar disposed within the pressurizable mixing vessel; and a brushless magnetic drive surrounding the pressurizable mixing vessel and configured to generate a rotating magnetic field, thereby rotating the magnetic stir bar to mix the first mixing substance with the second mixing substance.

Clause 9. The system of clause 8, further comprising a pump configured to pressurize the pressurizable mixing vessel.

Clause 10. The system of clause 8 or clause 9, further comprising: a heating element configured to heat the pressurizable mixing vessel, wherein the heating element surrounds the pressurizable mixing vessel and extends along a length of the pressurizable mixing vessel.

13

Clause 11. The system of any of clauses 8-10, wherein the magnetic stir bar is vertically oriented within the pressurizable mixing vessel.

Clause 12. The system of any of clauses 8-11, wherein the brushless magnetic drive further comprises: a stator comprising a plurality of stator teeth; and a plurality of windings wound around the plurality of stator teeth, wherein selective energization of the plurality of windings around the plurality of stator teeth generates the rotating magnetic field that causes rotation of the magnetic stir bar.

Clause 13. The system of any of clauses 8-12, wherein the pressurizable mixing vessel is a filter reactor, further comprising: a filter configured to filter a solid material resulting from a reaction of the first mixing substance with the second mixing substance in the mixing region, wherein a volume of the mixing region is in a range of 1 milliliter to 20 milliliters.

Clause 14. The system of any of clauses 8-13, wherein the brushless magnetic drive is adjustable vertically along a length of the pressurizable mixing vessel to adjust a vertical position of the magnetic stir bar.

Clause 15. A system for planar vessel mixing, comprising: a mixing vessel, comprising: a fluid inlet; a mixing region configured to receive a first mixing substance and a second mixing substance via the fluid inlet; and at least one outlet fluidly connected to the mixing region; a magnetic stir bar disposed within the mixing vessel; a first brushless magnetic drive surrounding the mixing vessel and operable to generate a first magnetic field that rotates a first magnetic stir bar to thereby mix the first mixing substance and the second mixing substance; and a second brushless magnetic drive that surrounds the mixing vessel.

Clause 16. The system of clause 15, further comprising: a second magnetic stir bar, wherein the second brushless magnetic drive is configured to generate a second magnetic field that rotates the second magnetic stir bar.

Clause 17. The system of clause 15 or clause 16, further comprising: a controller comprising at least one H-bridge and operable to rotate the first magnetic field and the second magnetic field to control a rotational speed and direction of the first magnetic stir bar and of the second magnetic stir bar.

Clause 18. The system of any of clauses 15-17, further comprising: a heating element configured to heat the mixing vessel, wherein the heating element surrounds the mixing vessel and extends along a length of the mixing vessel.

Clause 19. The system of any of clauses 15-18, wherein the heating element is an electric heating element coupled to an exterior of the mixing vessel, wherein at least one of the first brushless magnetic drive or the second brushless magnetic drive surrounds the electric heating element.

Clause 20. The system of any of clauses 15-19, wherein the mixing vessel is a double-walled mixing vessel, wherein the heating element is a recirculating heater that recirculates fluid between a first wall and a second wall of the double-walled mixing vessel.

Although the present disclosure has been described with reference to the embodiments illustrated in the attached drawing figures, it is noted that equivalents may be employed, and substitutions made herein without departing from the scope of the present disclosure as recited in the claims.

14

Having thus described various embodiments of the present disclosure, what is claimed as new and desired to be protected by Letters Patent includes the following:

1. A mixing system, comprising:
   a mixing vessel, comprising:
      a fluid inlet;
      a mixing region configured to receive a first mixing substance and a second mixing substance via the fluid inlet; and
      at least one outlet fluidly connected to the mixing region;
   a first magnetic stir bar disposed within the mixing vessel;
   a first brushless magnetic drive that surrounds the mixing vessel and that is configured to generate a first rotating magnetic field, thereby rotating the first magnetic stir bar;
   a second magnetic stir bar disposed within the mixing vessel;
   a second brushless magnetic drive that surrounds the mixing vessel and that is configured to generate a second rotating magnetic field that rotates the second magnetic stir bar,
   wherein rotating at least one of the first magnetic stir bar and the second magnetic stir bar mixes the first mixing substance with the second mixing substance; and
   a controller configured to control a speed and a direction of at least one of the first rotating magnetic field or the second rotating magnetic field.

2. The mixing system of claim 1, further comprising a heating element configured to heat the mixing vessel,
   wherein the heating element surrounds the mixing vessel and extends along an exterior length of the mixing vessel.

3. The mixing system of claim 1, wherein the mixing region has a volume less than 100 milliliters.

4. The mixing system of claim 1, further comprising a pump coupled to the mixing vessel and operable to pressurize the mixing vessel.

5. The mixing system of claim 1, wherein the first brushless magnetic drive is adjustable vertically along a length of the mixing vessel to adjust a vertical position of the first magnetic stir bar.

6. The mixing system of claim 1, wherein the second brushless magnetic drive is adjustable vertically along a length of the mixing vessel to adjust a vertical position of the second magnetic stir bar.

7. A system for vessel mixing, comprising:
   a pressurizable mixing vessel, comprising:
      at least one inlet;
      a mixing region configured to receive a first mixing substance and a second mixing substance via the at least one inlet; and
      at least one outlet fluidly connected to the mixing region;
   a first magnetic stir bar disposed within the pressurizable mixing vessel;
   a first brushless magnetic drive surrounding the pressurizable mixing vessel and configured to generate a first rotating magnetic field, thereby rotating the first magnetic stir bar;
   a second magnetic stir bar disposed within the pressurizable mixing vessel; and
   a second brushless magnetic drive surrounding the pressurizable mixing vessel and configured to generate a second rotating magnetic field, thereby rotating the second magnetic stir bar, wherein rotating at least one of the first magnetic stir bar and the second magnetic stir bar mixes the first mixing substance with the second mixing substance.

8. The system of claim 7, further comprising a pump configured to pressurize the pressurizable mixing vessel.

9. The system of claim 7, further comprising:
a heating element configured to heat the pressurizable mixing vessel,
wherein the heating element surrounds the pressurizable mixing vessel and extends along
a length of the pressurizable mixing vessel.

10. The system of claim 7, wherein the first magnetic stir bar is vertically oriented within the pressurizable mixing vessel.

11. The system of claim 7, wherein the first brushless magnetic drive further comprises:
a stator comprising a plurality of stator teeth; and
a plurality of windings wound around the plurality of stator teeth,
wherein selective energization of the plurality of windings around the plurality of stator teeth of the first brushless magnetic drive generates the first rotating magnetic field that causes rotation of the first magnetic stir bar.

12. The system of claim 7,
wherein the pressurizable mixing vessel is a filter reactor comprising: a filter configured to filter a solid material resulting from a reaction of the first mixing substance with the second mixing substance in the mixing region,
wherein a volume of the mixing region is in a range of 1 milliliter to 20 milliliters.

13. The system of claim 7, wherein the first brushless magnetic drive is adjustable vertically along a length of the pressurizable mixing vessel to adjust a vertical position of the first magnetic stir bar.

14. The system of claim 7, wherein the second brushless magnetic drive is adjustable vertically along a length of the pressurizable mixing vessel to adjust a vertical position of the second magnetic stir bar.

15. A system for planar vessel mixing, comprising:
a mixing vessel, comprising:
a fluid inlet;
a mixing region configured to receive a first mixing substance and a second mixing substance via the fluid inlet; and
at least one outlet fluidly connected to the mixing region;
a first magnetic stir bar disposed within the mixing vessel;
a first brushless magnetic drive surrounding the mixing vessel and operable to generate a first magnetic field that rotates the first magnetic stir bar;
a second magnetic stir bar disposed within the mixing vessel; and
a second brushless magnetic drive surrounding the mixing vessel and operable to generate a second magnetic field that rotates the second magnetic stir bar,
wherein rotating at least one of the first magnetic stir bar or the second magnetic stir bar mixes the first mixing substance with the second mixing substance.

16. The system of claim 15, further comprising:
a controller comprising at least one H-bridge and operable to rotate the first magnetic field and the second magnetic field to control a rotational speed and a direction of the first magnetic stir bar and of the second magnetic stir bar.

17. The system of claim 15, further comprising:
a heating element configured to heat the mixing vessel,
wherein the heating element surrounds the mixing vessel and extends along a length of the mixing vessel.

18. The system of claim 17,
wherein the heating element is an electric heating element coupled to an exterior of the mixing vessel,
wherein at least one of the first brushless magnetic drive or the second brushless magnetic drive surrounds the electric heating element.

19. The system of claim 17,
wherein the mixing vessel is a double-walled mixing vessel,
wherein the heating element is a recirculating heater that recirculates fluid between a first wall and a second wall of the double-walled mixing vessel.

20. The system of claim 15, further comprising:
a sensor configured to monitor a position of the first magnetic stir bar and a position of the second magnetic stir bar.

* * * * *